US008325602B2

(12) United States Patent
Rivers et al.

(10) Patent No.: US 8,325,602 B2
(45) Date of Patent: Dec. 4, 2012

(54) METHOD AND SYSTEM TO MANAGE NETWORK TRAFFIC CONGESTION IN NETWORKS WITH LINK LAYER FLOW CONTROL

(75) Inventors: James Paul Rivers, Saratoga, CA (US); Balaji Prabhakar, Palo Alto, CA (US); Peter Newman, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 351 days.

(21) Appl. No.: 12/641,142

(22) Filed: Dec. 17, 2009

(65) Prior Publication Data

US 2010/0157803 A1 Jun. 24, 2010

Related U.S. Application Data

(60) Provisional application No. 61/138,767, filed on Dec. 18, 2008.

(51) Int. Cl.
*H04J 1/16* (2006.01)
*H04L 12/28* (2006.01)
(52) U.S. Cl. .......................... 370/230; 370/235; 370/412
(58) Field of Classification Search .................. 370/230, 370/235, 252, 412
See application file for complete search history.

(56) References Cited

U.S. PATENT DOCUMENTS

| 6,151,300 | A | * | 11/2000 | Hunt et al. | 370/231 |
|---|---|---|---|---|---|
| 6,614,757 | B1 | * | 9/2003 | Rochberger et al. | 370/231 |
| 7,130,279 | B2 | * | 10/2006 | Alves et al. | 370/255 |
| 7,620,693 | B1 | * | 11/2009 | Mott et al. | 709/213 |
| 2006/0239194 | A1 | * | 10/2006 | Chapell | 370/235 |
| 2007/0005903 | A1 | * | 1/2007 | Lau et al. | 711/137 |
| 2008/0040519 | A1 | * | 2/2008 | Starr et al. | 710/39 |
| 2009/0274047 | A1 | * | 11/2009 | Kruys et al. | 370/236 |
| 2010/0257247 | A1 | * | 10/2010 | Kulig et al. | 709/206 |

* cited by examiner

*Primary Examiner* — Andrew Lee
(74) *Attorney, Agent, or Firm* — Schwegman, Lundberg & Woessner, P.A.

(57) ABSTRACT

A method and system to manage network traffic congestion in networks with link layer flow control is provided. The system comprises a physical queue monitor configured to monitor a state of a physical queue at a network device, a link layer flow control activator configured to activate link layer flow control based on the state of the physical queue, a proxy queue control module, a proxy queue monitor to monitor the state of the proxy queue, and a transport layer flow control activator. The proxy queue control module may be configured to update a state of a proxy queue based on the state of the physical queue. The proxy queue monitor may be configured to monitor the state of the proxy queue. The transport layer flow control activator may be configured to activate transport layer flow control based on the state of the proxy queue.

20 Claims, 5 Drawing Sheets

METHOD AND SYSTEM TO MANAGE NETWORK TRAFFIC CONGESTION IN NETWORKS WITH LINK LAYER FLOW CONTROL

PRIORITY CLAIM

This non-provisional patent application claims the benefit of the filing date of U.S. Provisional Patent Application Ser. No. 61/138,767; filed Dec. 18, 2008; and entitled, "METHOD AND SYSTEM TO MANAGE NETWORK TRAFFIC CONGESTION IN NETWORKS WITH LINK LAYER FLOW CONTROL," the content of which is incorporated by reference herein.

FIELD

This application relates to methods and systems to manage network traffic congestion in networks with link layer flow control.

BACKGROUND

Congestion is a networking term that refers to a situation where too much network traffic is clogging network pathways. Common causes of congestion may include too many users being active on a single network segment or collision domain, high demand from bandwidth-intensive networked applications, a rapidly growing number of users accessing the Internet, the increased power of personal computers (PCs) and servers, etc.

One common indicator of network congestion is increased network delay. All networks have a limited data-carrying capacity. When the load is light, the average time from when a host submits a packet for transmission until it is actually sent on the network is relatively short. When many users are vying for connections and communicating, the average delay increases. This delay has the effect of making the network appear "slower," because it takes longer to send the same amount of data under congested conditions than it does when the load is light. In extreme circumstances, an application can fail completely under a heavy network load. Sessions may timeout and disconnect, and applications or operating systems may actually crash, requiring a system restart.

BRIEF DESCRIPTION OF DRAWINGS

Embodiments of the present invention are illustrated by way of example and not limitation in the figures of the accompanying drawings, in which like references indicate similar elements and in which.

OVERVIEW

A method and system to manage network traffic congestion in networks with link layer flow control is provided. The system comprises a physical queue monitor configured to monitor a state of a physical queue at a network device, a link layer flow control activator configured to activate link layer flow control based on the state of the physical queue, a proxy queue control module, a proxy queue monitor to monitor the state of the proxy queue, and a transport layer flow control activator. The proxy queue control module may be configured to update a state of a proxy queue based on the state of the physical queue. The proxy queue monitor may be configured to monitor the state of the proxy queue. The transport layer flow control activator may be configured to activate transport layer flow control based on the state of the proxy queue.

DESCRIPTION OF EXAMPLE EMBODIMENTS

In networking, a network flow from a traffic source directed to a traffic destination (sometimes referred to as a traffic sink) may go though one or more interconnect devices, such as, for example, network switches and network routers. An interconnect device that is responsible for forwarding network flow from the source of traffic to the traffic sink may maintain a data queue to facilitate storing and processing of the incoming traffic. An interconnect device may be unable to process the incoming messages (or frames) at the rate the messages are arriving, which may result in the data queue getting filled up. The state of a data queue that has been filled to a predetermined threshold may also be referred to the data queue being depleted, referring to the depletion of capacity of the data queue to accept network frames.

In order to address this issue, an interconnect device may be configured to detect that the data queue is filled beyond a predetermined threshold and to assert a congestion management mechanism. Congestion management or flow control techniques may be implemented at the link layer, as well as at the transport layer. Link layer flow control may be particularly useful for alleviating short term, or transient, congestion, while transport layer flow control may be better suited to manage long term, or sustained, congestion.

Many network protocols rely on signaling data queue occupancy to invoke transport layer congestion management algorithms, the Internet Protocol's Transmission Control Protocol (TCP/IP) algorithm being a broad example of such (see rfc2581: Stevens, W., Allman, M. and V. Paxson, "TCP Congestion Control", RFC 2581, April 1999). Data queue occupancy may be signaled to a source node either explicitly, through a mechanism such as the Internet Protocol's Explicit Congestion Notification mechanism (see rfc3168: K. Ramakrishnan, S. Floyd, D. Black, "The Addition of Explicit Congestion Notification (ECN) to IP," RFC 3168, Sep. 2001.), or implicitly, e.g., via packet drops. The signaling of congestion can also occur at a hard boundary, such as tail-drop when a data queue is full, or at a rate proportional to the data queue occupancy, such as Random Early Detection (see Sally Floyd and Van Jacobson, "Random Early Detection Gateways for Congestion Avoidance," IEEE/ACM Transactions on Networking, Aug. 1993). These protocols and the associated transport layer congestion management (also referred to as flow control) are typically enacted at an end-to-end scale, and, as such, have relatively large time constants in their control loops. For example, communication between a computer on the West Coast and a web server on the East Coast of the United States is likely to have a greater delay than a delay in communication between a computer and a server both housed in the same data center.

Link layer flow control allows the use of very small buffers acting as a data queue (also referred to as a physical queue) to facilitate storing and processing of the incoming traffic and also attempts to avoid dropping any frames. Asserting link layer flow control may pause the incoming traffic until the physical queue has sufficiently drained. Using small buffers to facilitate storing and processing the incoming traffic, while contributing to effective use of resources, provides only a limited view into the state of the network traffic and assumes that any oversubscription of the physical queue is caused by a temporary burst in network traffic. Consequently, the small physical queues coupled with the small time constants involved in the link layer flow control loop, can adversely affect the behavior of the end-to-end congestion control loops.

In a real (or physical) packet queue real packets are queued. A running count is kept of how many packets the queue contains at any time. This running count can provide a measure of the instantaneous congestion if the queue is large enough to contain sufficient packets. If the queue is not large enough a measure of the instantaneous congestion may be obtained using a proxy queue. A proxy queue maintains a running count of packets but does not actually store them in a real queue. One embodiment of a proxy queue uses a counter. The counter increments the count by the packet length when a packet arrives. The counter is decremented at a fixed rate. The fixed rate is chosen to be slightly less than the outgoing line rate. So, if the output line is busy transmitting packets continuously the counter of the proxy queue will grow in value thus indicating congestion. If the arrival of packets is controlled by a link layer protocol, an alternative embodiment may be utilized, as activation of the link layer protocol interrupts the further arrival of packets. In this embodiment the proxy queue is incremented and decremented by the packet length on the arrival and departure of packets. Should the link layer protocol be activated, packet arrival at the proxy queue is simulated by incrementing the proxy queue counter at a fixed rate.

In one example embodiment, a proxy queue may be used in addition to the queue that is used to store and process incoming network traffic—a data queue or a physical queue—as an auxiliary mechanism to be used in congestion measurement and signaling. Because a proxy queue is not a physical queue, the depth of a proxy queue may be chosen to be larger than that of the data buffer that acts as a physical queue, such that congestion measurement/signaling constructs that are appropriate to upper layer protocols may be provided, while using link layer flow control to absorb instantaneous oversubscription of the system's physical data buffer(s). One or more proxy queues that are configured to correspond to the one or more physical data buffers may be applied to various network protocols that rely on the state of a queue to detect congestion. Examples of such protocols include, e.g., TCP/IP and IEEE 802.1Qau.

According to one example embodiment, a system to manage network congestion may monitor a set of physical queues, e.g., input queues or output queues used for traffic segregation, the set of physical queues being subject to link layer flow control semantics both in terms of controlling their ability to drain and their ability to signal to their corresponding feeders to pause when the resources of the physical queues are depleted. The system may also maintain a set of proxy queues corresponding to the set of physical queues. The occupancy of a proxy queue is determined based on the state of its corresponding physical queue. The proxy queue monitors the physical queue with respect to the frames arriving into the physical queue, the frames being drained from the physical queue, and with respect to the link layer flow control status. The occupancy of a proxy queue, in turn, dictates whether to assert upper level flow control, such as Backward Congestion Notification (BCN), Explicit Congestion Notification (ECN), TCP tail drops, etc.

In operation, when a physical queue receives and drains network frames at a rate that does not cause the physical queue to become oversubscribed, the corresponding proxy queue mimics the physical queue in adding and draining the frames. When the physical queue experiences congestion and the congestion results in asserting link layer flow control (in pausing the incoming traffic, for example), the proxy queue, being larger in size than the physical queue, proceeds to simulate the receiving of the incoming frames. If the congestion that caused the link layer flow control to be triggered is a short term condition, the link layer flow control would be deactivated based on the state of the physical queue before the proxy queue is depleted of resources. If, however, the congestion lasts longer than a short period of time and causes the proxy queue to become filled up to a certain threshold, the system to manage network congestion may trigger transport layer flow control based on the state of the proxy queue. In one embodiment, the proxy queue has an upper limit beyond which its associated counter cannot be further incremented. Its lower limit is zero, beyond which it cannot be decremented. If the physical queue is empty but the proxy queue is not, the proxy queue is decremented at line rate. The proxy queue also may be configured to have a lower threshold. If the proxy queue count falls below the lower threshold, any ongoing congestion control action is cancelled.

As mentioned above, a proxy queue may be provided of a size significantly greater than the size of its corresponding physical queue. Utilizing a proxy queue of a larger size allows the congestion management system to accumulate a longer term view of the state of the network, as compared to when evaluating the state of the network is based on the small physical queue that is subject to the link layer flow control. Accordingly, the link layer flow control may be triggered to handle short term congestion, while the proxy queue is being monitored for an indication that the current back up of the physical queue is a result of sustained congestion that warrants the enactment of an upper level flow control. Thus, in one example embodiment, a physical queue with a link layer flow control drives the behavior of a proxy queue, while the state of the proxy queue drives the upper level flow control logic. An example embodiment of a network environment within which a system to manage network traffic congestion utilizing a proxy queue may be implemented is described below with reference to FIG. 1.

Figure 1:
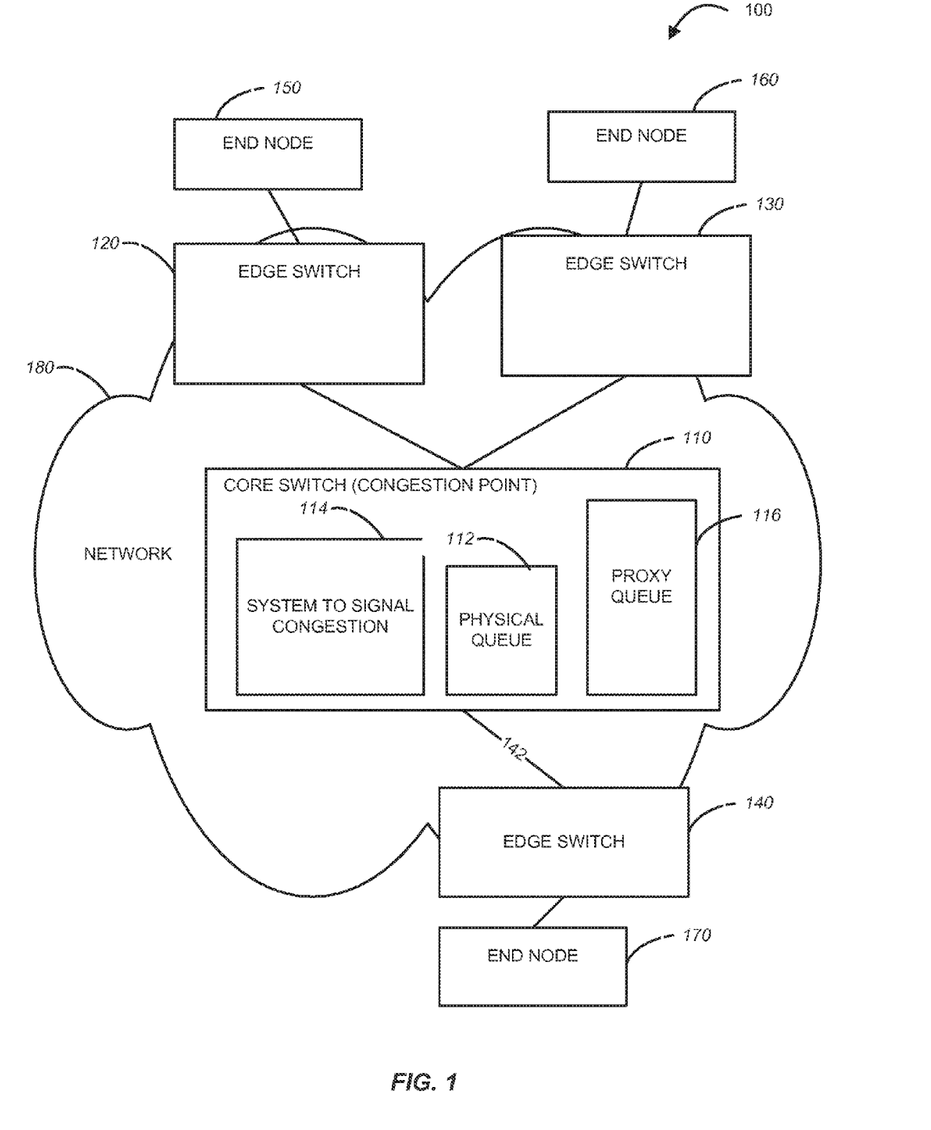
FIG. 1 is a diagrammatic representation of a network environment within which an example embodiment may be implemented.

FIG. 1 illustrates a network environment 100. The environment 100, in an example embodiment, includes a core switch 110, a number of edge switches 120, 130, and 140, and end nodes 150, 160 and 170. The core switch 110, the edge switches 120, 130, and 140, and the end nodes 150, 160 and 170 are shown in FIG. 1 as coupled to a communications network 180. The communications network 180 may be a public network (e.g., the Internet, a wireless network, etc.) or a private network (e.g., LAN, WAN, Intranet, etc.).

The end nodes 150 and 160 may simultaneously send network traffic at a line rate of, e.g., 10 Gbps, to the end node 170 via the core switch 110. In order to store and process incoming network traffic, the core switch 110 includes a data buffer referred to as a physical queue 112. The aggregate rate of traffic originating from the end nodes 150 and 160 may exceed the capacity of the link 142 connecting the core switch 110 to the edge switch 140, which may cause network congestion that manifests itself in the physical queue 112 becoming oversubscribed. Specifically, the depth of a physical queue 112, which is associated with the link 142, may increase significantly above the target level around which the queue length should oscillate under normal congestion conditions.

The core switch 110 may be configured to support a link layer flow control and also a transport layer flow control by hosting a system to manage network traffic congestion 114. The system to manage network traffic congestion 114 may be configured to monitor the depth of the physical queue 112 to determine whether the link layer flow control should be triggered and to also monitor a proxy queue 116 to determine whether the current state of congestion is not merely a short term burst in network traffic and whether it warrants a flow control to be invoked at the transport level. It will be noted that, while the core switch 110 is illustrated as including one physical queue and one proxy queue, an interconnect device (e.g., a network switch or an adaptor) may include a number of physical queues and a number of corresponding proxy queues. A system to manage network traffic congestion may be provided at any congestion point, e.g., at the edge switch 140, at the end node 170, etc. Example components of a system to manage network traffic congestion may be described with reference to FIG. 2.

Figure 2:
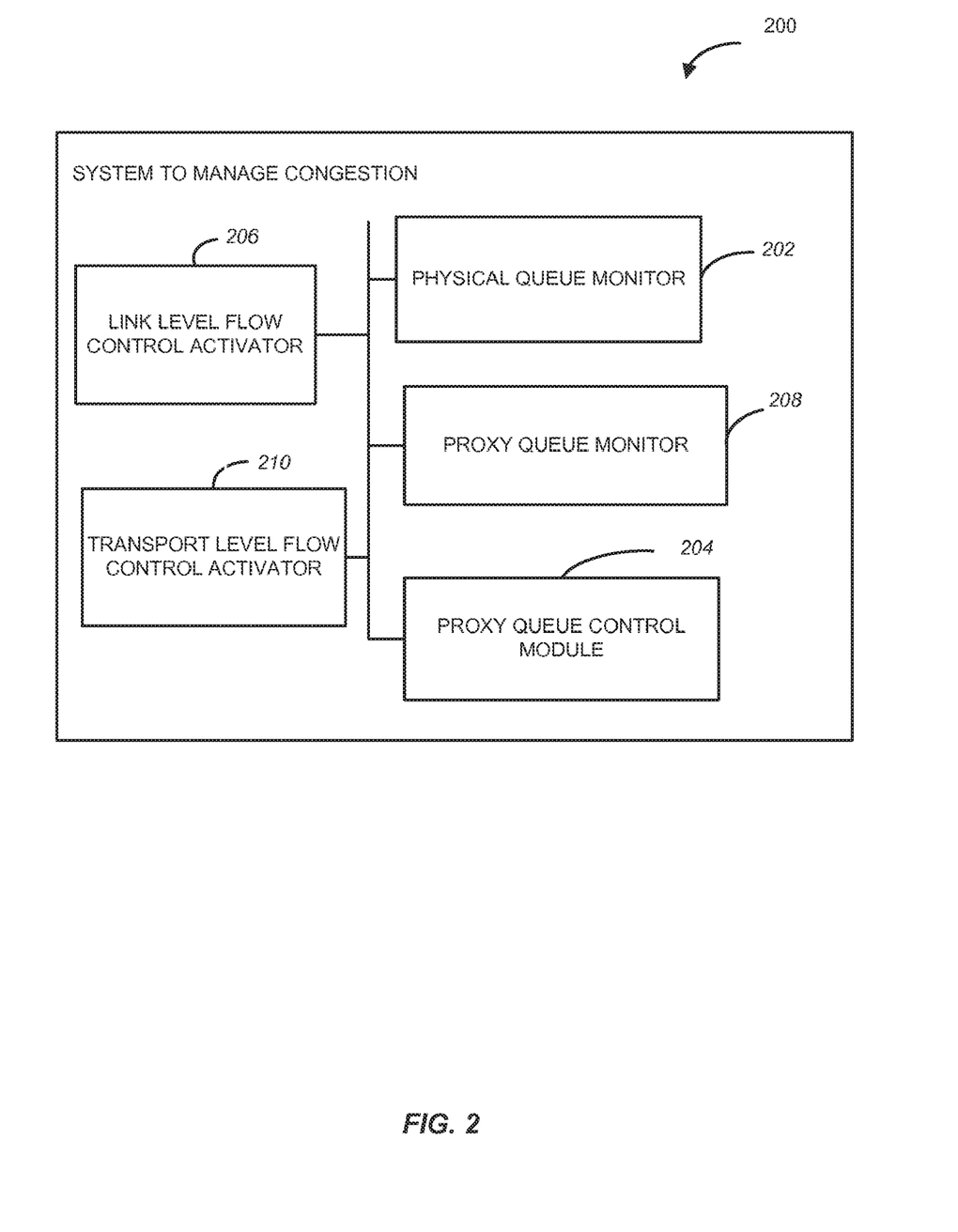
FIG. 2 is a diagrammatic representation of a system to manage network traffic congestion in networks with link layer flow control, in accordance with an example embodiment.

Referring to FIG. 2, a system to manage network traffic congestion 200, in one example embodiment, includes a physical queue monitor 202, a proxy queue control module 204, a link layer flow control activator 206, a proxy queue monitor 208, and a transport layer flow control activator 210. It will be noted that, while a proxy queue and a physical queue are not shown in FIG. 2, these queues may be configured as part of a system to manage network traffic congestion. An example congestion point queue environment 300 is illustrated in FIG. 3.

Figure 3:
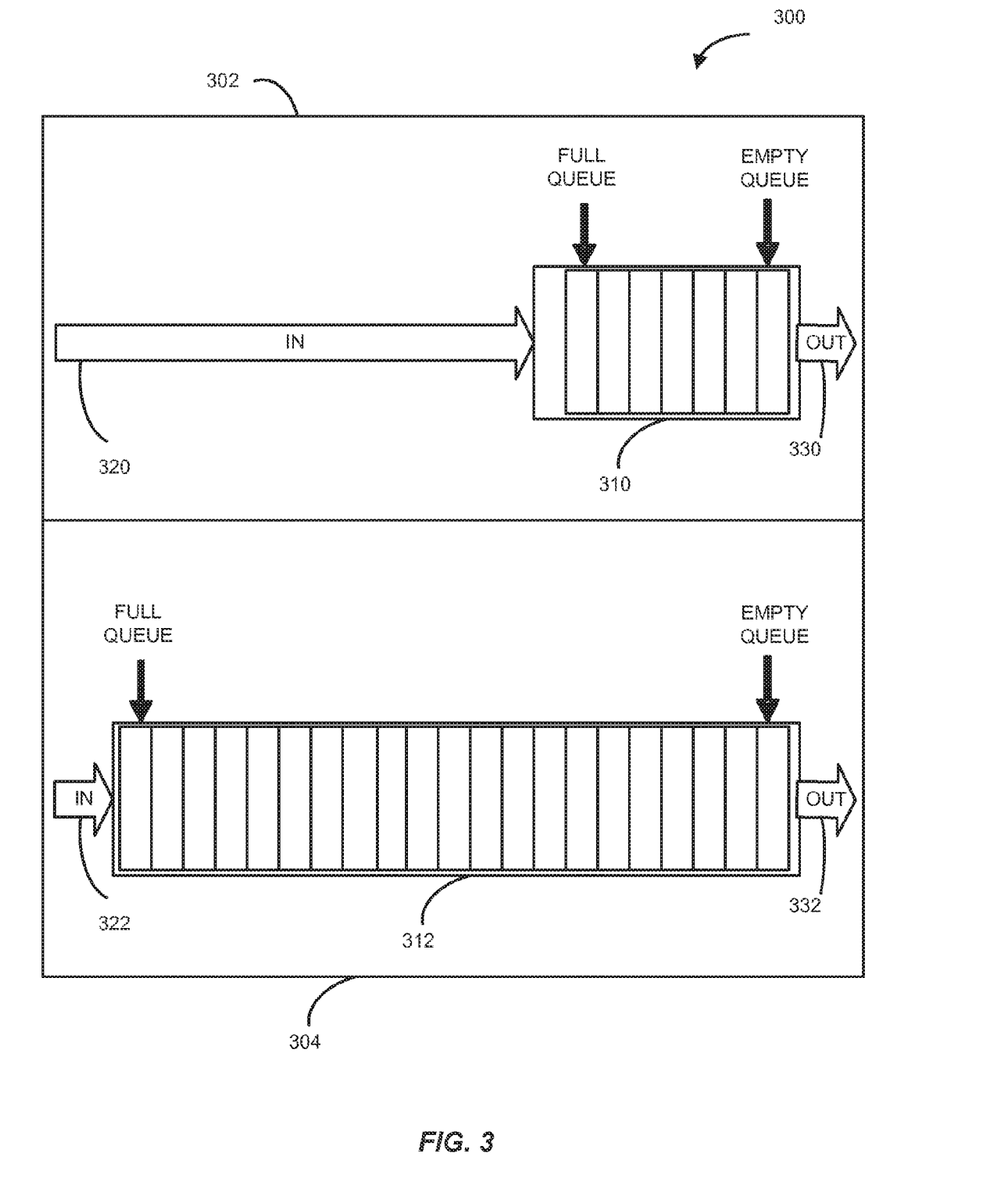
FIG. 3 illustrates a physical queue and a proxy queue, in accordance with an example embodiment.

Area 302 in FIG. 3 illustrates a physical queue 310 and area 304 illustrates a corresponding proxy queue 312. The physical queue 310 is shown to be significantly smaller in size than the proxy queue 312, such that when the physical queue 310 is depleted of resources and can no longer receive input frames 320, the proxy queue 312 continues to operate in a non-congested state and may continue receiving input frames 322. As mentioned above, the proxy queue 312 may drain the frames 332 by mimicking the draining of frames 330 from the physical queue 310.

Returning to FIG. 2, the physical queue monitor 202 may be configured to monitor a state of a physical queue at a network device (e.g., the state of the physical queue 112 at the core switch 110 of FIG. 1). The link layer flow control activator 206 may be configured to activate link layer flow control based on the state of the physical queue 112. The proxy queue control module 204 may be configured to update a state of a proxy queue (e.g., the proxy queue 116 of FIG. 1) based on the state of the physical queue 112. The proxy queue monitor 208 may be configured to monitor the state of the proxy queue. The transport layer flow control activator 210 may be configured to activate transport layer flow control based on the state of the proxy queue 116. Example operations performed by the system to manage network traffic congestion 200 may be described with reference to FIG. 4.

Figure 4:
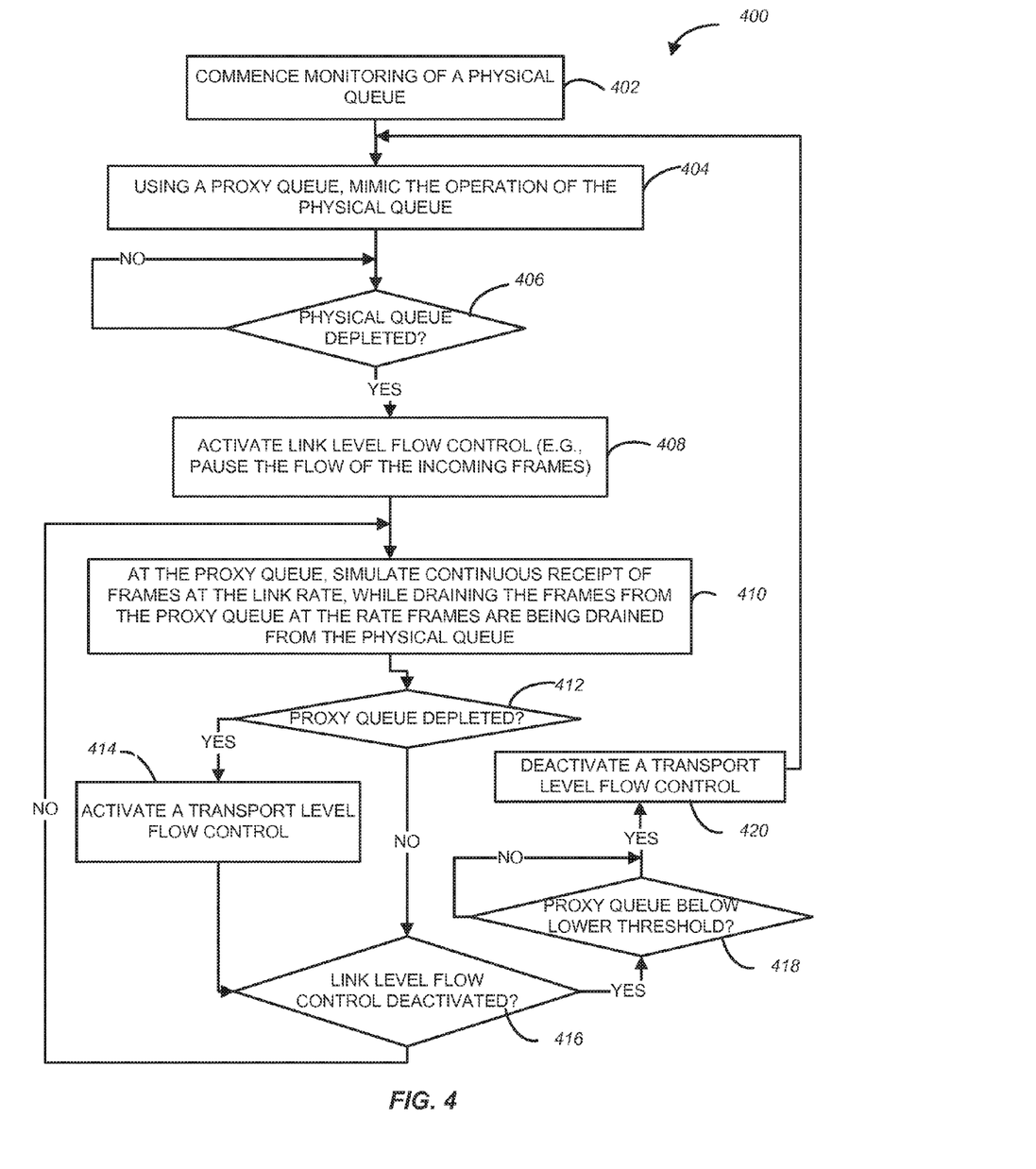
FIG. 4 is a flow chart of a method to signal congestion in networks with link layer flow control, in accordance with an example embodiment.

FIG. 4 is a flow chart of a method 400 to manage network traffic congestion, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the method 400 may be performed by the various modules discussed above with reference to FIG. 2. Each of these modules may comprise processing logic.

As shown in FIG. 4, at operation 402, the physical queue monitor 202 of FIG. 2 commences monitoring of the physical queue 112 of FIG. 1. The proxy queue control module 204 of FIG. 4 operates the proxy queue 116 of FIG. 1 by mimicking the operation of the physical queue 112 (operation 404). As already mentioned above, the proxy queue 116 may mimic the physical queue 112 in adding a frame each time a frame is added to the physical queue and removing a frame from the proxy queue 116 each time a frame is drained from the physical queue 112.

If, at operation 406, the physical queue monitor 202 determines that the physical queue 112, which may be characterized by a small buffer size, is depleted, the link layer flow control activator 206 of FIG. 2 activates link layer flow control at operation 408, which may entail pausing the network traffic directed to the physical queue 112. The operation of the proxy queue 116 changes when the link layer flow control is activated. In one example embodiment, when the link layer flow control activator 206 activates link layer flow control such that network frames are paused from being added into the physical queue 112, the proxy queue control module 204 changes the operation of the proxy queue 116 from mimicking the receipt of the network frames at the physical queue 112 to simulating the adding of network frames into the proxy queue 116, e.g., at line rate. While the proxy queue control module 204 simulates the adding of network frames into the proxy queue 116, at operation 410, it continues mimicking the physical queue 112 in draining the network frames. As mentioned above, the proxy queue 116 may be configured to be greater in size than the physical queue 112. The proxy queue 116 may thus be able to withstand network congestion for a longer period of time than the physical queue 112. This characteristic of the proxy queue 116 may be leveraged to detect, with increased accuracy, the congestion state of the network that may no longer be adequately alleviated by link layer measures and instead may require congestion management measures to be taken at the higher level.

While the proxy queue 116 may be made significantly larger than the physical queue 112, a certain level of congestion may cause the proxy queue 116 to become depleted of resources. If the proxy queue monitor 208 detects, at operation 412, that the proxy queue 116 is depleted, the proxy queue monitor 208 may convey this information to the transport layer flow control activator 210 of FIG. 2. The transport layer flow control activator 210 may then activate transport layer flow control at operation 414. As mentioned above, transport layer flow control may be, e.g., BCN, ECN, TCP tail drop, or any other transport layer flow control mechanism.

At operation 416, the physical queue monitor 202 determines whether the link layer flow control has been deactivated such that the network frames can be permitted to flow into the physical queue 112. If it is determined, at operation 416, that the link layer flow control has been deactivated by the link layer flow control activator 206, and that the proxy queue 116 is below the lower threshold (determined at operation 418), the transport layer flow control activator 210 deactivates transport layer flow control at operation 420. Thus, if network congestion that causes the physical queue 112 to fill up and trigger link layer flow control is a transient state, the proxy queue 116, being of a larger size than the physical queue 112, does not become depleted of resources to the level that triggers transport layer flow control. If, on the other hand, network congestion that causes the physical queue 112 to fill up is long term or sustained condition, the oversubscribed state of the proxy queue 116 is used to activate transport layer flow control.

Figure 5:
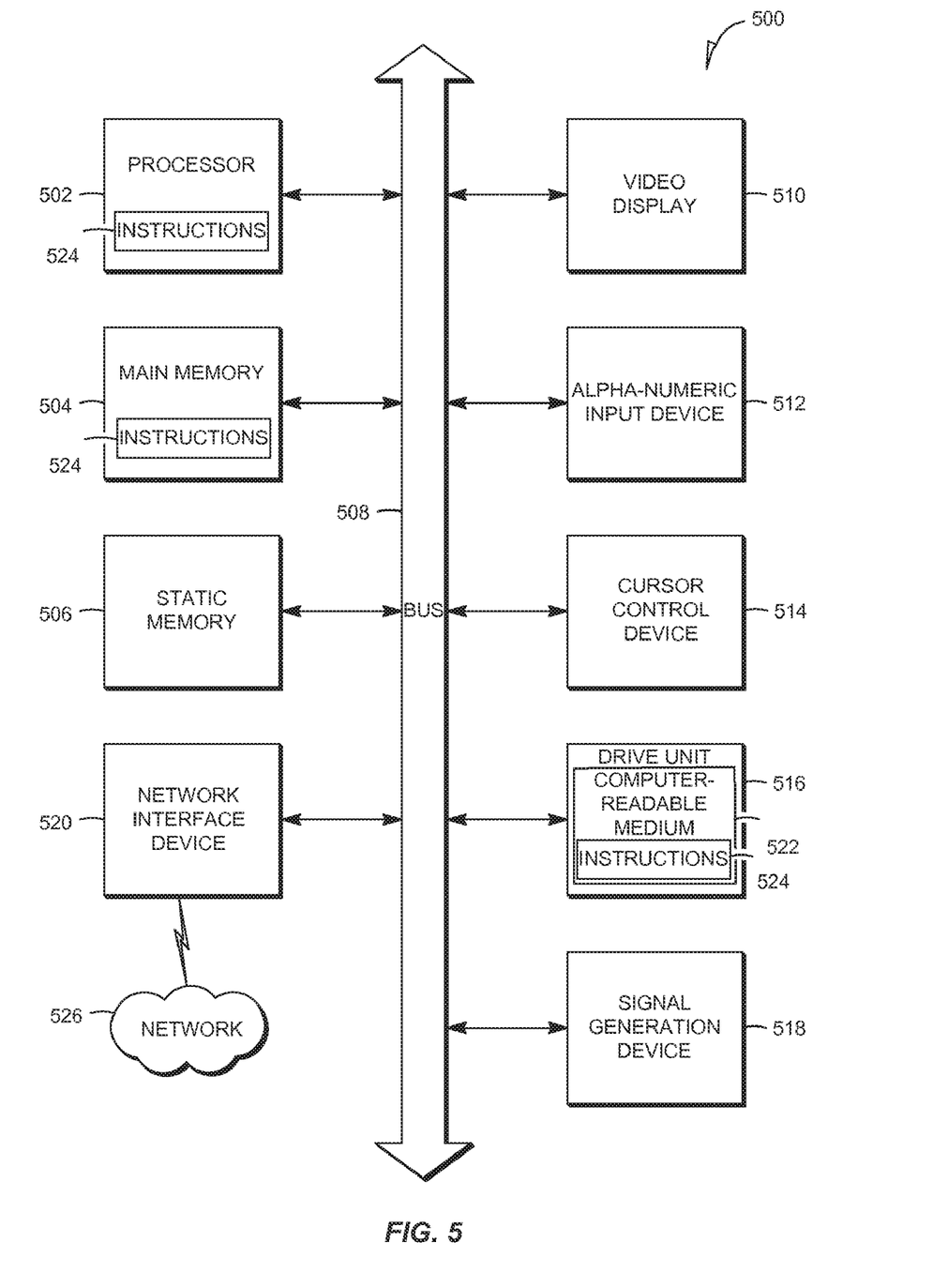
FIG. 5 illustrates a diagrammatic representation of an example machine in the form of a computer system within which a set of instructions, for causing the machine to perform any one or more of the methodologies discussed herein, may be executed.

FIG. 5 shows a diagrammatic representation of a machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a voice mail system, a cellular telephone, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), optionally a user interface (UI) navigation device 514 (e.g., a mouse), optionally a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols, e.g., a Hyper Text Transfer Protocol (HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROMs), and the like.

The embodiments described herein may be implemented in an operating environment comprising software installed on any programmable device, in hardware, or in a combination of software and hardware.

Thus, method and system to manage network traffic congestion in networks with link layer flow control have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
    a physical queue monitor to monitor a state of a physical queue at a network device;
    a link layer flow control activator to activate link layer flow control based on the state of the physical queue;
    a proxy queue control module to update a state of a proxy queue based on the state of the physical queue;
    a proxy queue monitor to monitor the state of the proxy queue; and
    a transport layer flow control activator to activate transport layer flow control based on the state of the proxy queue.

2. The system of claim 1, wherein the proxy queue control module is to update the state of the proxy queue by mimicking the state of the physical queue in receiving and draining network frames when the physical queue is in a mode of receiving network frames.

3. The system of claim 1, wherein the proxy queue control module is to update the state of the proxy queue by simulating receiving of network frames at the proxy queue and mimicking the physical queue in draining network frames from the proxy queue when the link layer flow control is activated.

4. The system of claim 1, wherein the link layer flow control activator is to deactivate the link layer flow control based on the state of the physical queue.

5. The system of claim 4, wherein the proxy queue control module is to resume mimicking the physical queue in adding and draining network frames at the proxy queue.

6. The system of claim 1, wherein the transport layer flow control is a backward congestion notification.

7. The system of claim 1, wherein the transport layer flow control is an explicit congestion notification.

8. The system of claim 1, wherein the size of the proxy queue is greater than the size of the physical queue.

9. The system of claim 1, wherein the physical queue and the proxy queue reside at a network switch.

10. The system of claim 1, wherein the physical queue and the proxy queue reside at a network adaptor.

11. A method comprising:
    monitoring a state of a physical queue at a network device;
    updating a state of a proxy queue based on the state of the physical queue;
    activating link layer flow control based on the state of the physical queue; and
    activating transport layer flow control based on the state of the proxy queue.

12. The method of claim 11, wherein the updating of the state of the proxy queue based on the state of the physical queue comprises mimicking the physical queue in receiving and draining network frames when the physical queue is in a mode of receiving network frames.

13. The method of claim 11, wherein the updating of the state of the proxy queue based on the state of the physical queue comprises simulating receiving of network frames at the proxy queue and mimicking the physical queue in draining network frames from the proxy queue when the link layer flow control is activated.

14. The method of claim 11, comprising deactivating the link layer flow control based on the state of the physical queue.

15. The method of claim 14, comprising resuming, at the proxy queue, mimicking the physical queue in adding and draining network frames.

16. The method of claim 11, wherein the transport layer flow control is a backward congestion notification.

17. The method of claim 11, wherein the transport layer flow control is an explicit congestion notification.

18. The method of claim 11, wherein the size of the proxy queue is greater than the size of the physical queue.

19. The method of claim 11, wherein the physical queue and the proxy queue reside at a network switch.

20. Logic embedded in one or more tangible media for execution and when executed operable to:
   monitor a state of a physical queue at a network device;
   update a state of a proxy queue based on the state of the physical queue;
   activate link layer flow control based on the state of the physical queue; and
   activate transport layer flow control based on the state of the proxy queue.

* * * * *